April 17, 1928.  1,666,430
F. TIZZANI
INSTRUMENT FOR MEASURING THE PERIMETER OF TEETH
Filed Aug. 5, 1927
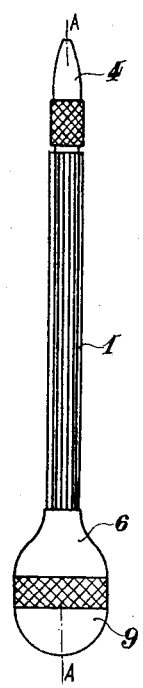
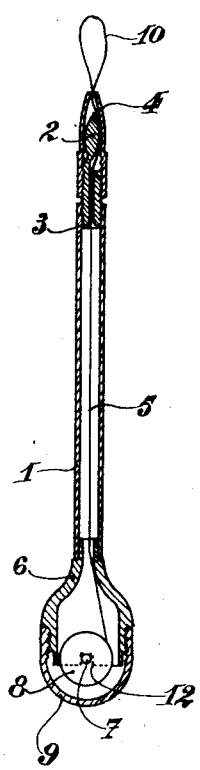
Inventor:
Felix Tizzani
By Emil Bönnelycke
Attorney Patented Apr. 17, 1928.

1,666,430

UNITED STATES PATENT OFFICE.

FELIX TIZZANI, OF LYON, FRANCE.

INSTRUMENT FOR MEASURING THE PERIMETER OF TEETH.

Application filed August 5, 1927, Serial No. 210,969, and in France May 9, 1927.

The present invention relates to an improved instrument for measuring the perimeter of a tooth.

This operation is generally effected by means of a loop of wire which is passed around the tooth. The ends of the wire are then twisted together and the loop takes exactly the shape of the tooth.

The instrument according to this invention permits of performing easily such an operation. It comprises a container for a spool of wire and a device for maintaining the ends of the loop of wire.

On the annexed drawings:

Fig. 1 is a plan view of the instrument.

Fig. 2 is a cross section on line A A (Fig. 1), a loop of wire being formed at the end of the instrument.

Fig. 3 illustrates diagrammatically the final shape of the loop.

The instrument comprises a hollow tubular member 1 which is provided at one end with a container for the wire and at the other end, with a fastening device for clamping the wire.

The fastening device comprises an inner ogive-shaped member 2 provided with a passage 3 which leads from the axial bore of tube 1 through the side of said member 2. A hollow conical member 4 is screwed on member 2.

The container for the wire comprises a cup 6 which supports the spindle 7 of the spool 8 by means of two notches 12, and a cover 9 which is screwed on the cup 6 to maintain the spool 8 and its spindle 7 in place.

The wire 5 from spool 8 passes through the tube 1, through the passage 3 and through the annular space between the parts 2 and 4.

In using the instrument, a convenient length of wire is drawn out of the conical member 4 and the free end of the wire is pushed into said member which is then screwed up. A loop 10 is thus formed, the ends of which are tightly clamped between parts 2 and 4.

The loop 10 is then passed around the tooth and the instrument is rotated. The ends of loop 10 are thus twisted together and the loop finally takes the exact shape of the tooth, as shown in Fig. 3.

On unscrewing conical member 4, then drawing another length of wire and then cutting off the loop 10 and its twisted ends, the instrument is again ready for another use.

What I claim is:

1. An instrument for measuring the perimeter of a tooth by means of a loop of wire, comprising a tube through which the wire is led, a cup attached to one end of the tube, a spool whereon the wire is wound rotatably mounted in said cup, a cover removably attached to the cup to hold the spool in place therein, and a device attached to the other end of the tube for clamping the ends of the loop formed with the wire; said clamping device embodying an inner ogival member fixed to the tube end, and an outer conical member movably mounted on the inner member and cooperating with the same to grip said loop ends between them.

2. An instrument for measuring the perimeter of a tooth by means of a loop of wire, comprising a tube through which the wire is led, a cup attached to one end of the tube and formed at its edge with a pair of oppositely-located notches, a spindle arranged in said cup with its ends fitting in the notches, a rotatable spool whereon the wire is wound mounted on said spindle, a cover removably attached to the cup to hold the spool and its spindle in place, and a device attached to the other end of the tube for clamping the ends of the loop formed with the wire.

3. An instrument for measuring the perimeter of a tooth by means of a loop of wire, comprising a tube through which the wire is led, a spool holder at one end of the tube, a spool whereon the wire is wound rotatably mounted in said holder, and a device at the other end of the tube for clamping the ends of the loop formed with the wire; said clamping device embodying an inner ogival member fixed to the tube end and formed with a passage for the wire which leads axially through the base of the member and opens laterally through one side thereof, and a hollow outer conical member adjustably fitting over the inner member and through which the wire is led to the outside from said passage, to coact with said inner member in gripping the wire between them.

In testimony whereof I affix my signature.

FELIX TIZZANI.